United States Patent [19]

Piper et al.

[11] 4,066,858
[45] Jan. 3, 1978

[54] VERTICAL FLOAT SWITCH

[75] Inventors: Jack Richard Piper, Mount Prospect; Leo W. Kaczmarek, Chicago, both of Ill.

[73] Assignee: International Telephone and Telegraph Corporation, New York, N.Y.

[21] Appl. No.: 632,168

[22] Filed: Nov. 17, 1975

[51] Int. Cl.² .............................................. H01H 35/40
[52] U.S. Cl. ..................................................... 200/84 C
[58] Field of Search ................ 200/84 C; 340/244 A; 73/308, 313

[56] References Cited

U.S. PATENT DOCUMENTS

| | | | |
|---|---|---|---|
| 2,440,987 | 5/1948 | Thompson | 200/84 C |
| 2,448,251 | 8/1948 | Campbell | 200/84 C |
| 2,612,572 | 9/1952 | Binford | 200/84 C |
| 3,013,135 | 12/1961 | Russo | 200/84 C |
| 3,270,158 | 8/1966 | Puster | 200/84 C |

Primary Examiner—David Smith, Jr.
Attorney, Agent, or Firm—James B. Raden; William J. Michals

[57] ABSTRACT

A vertical float switch, suitable for use as a low water cut-off control or the like, having differential adjustment means is disclosed. The float switch includes a hollow housing forming a float chamber which communicates with a hot water boiler vessel by way of vertically spaced equalizing lines. A non-magnetic sealing tube extends vertically away from the housing and communicates with the float chamber of the housing. A float rod is slidably mounted within the housing by way of a generally cylindrical guiding collar. A float is mounted to the lower end of the rod for translating the rod in accordance with the level of the water within the float chamber. An armature of magnetic material is fixedly mounted to the other end of the rod for translation with the tube in accordance with the level of the water within the boiler. A switch frame is clamped at a predetermined point along the tube, and includes a bracket pivotally mounted thereon for translation toward and away from the tube. A permanent magnet and a switch, such as a mercury switch or a microswitch, are carried by the bracket. A spring is mounted between the point on the bracket, which is above the pivotal axis, and a point on the switch frame and functions to urge the permanent magnet away from the tube. The spring mounting point on the switch frame includes a slotted adjustable fastener for adjusting the length of the spring and, therefore, the spring force. Accordingly, the on-off differential of the switch is adjusted by adjusting the position of the slotted fastener. The cylindrical collar functions as a guide and maintains a given spaced-apart relationship between the float and the float chamber walls.

7 Claims, 4 Drawing Figures

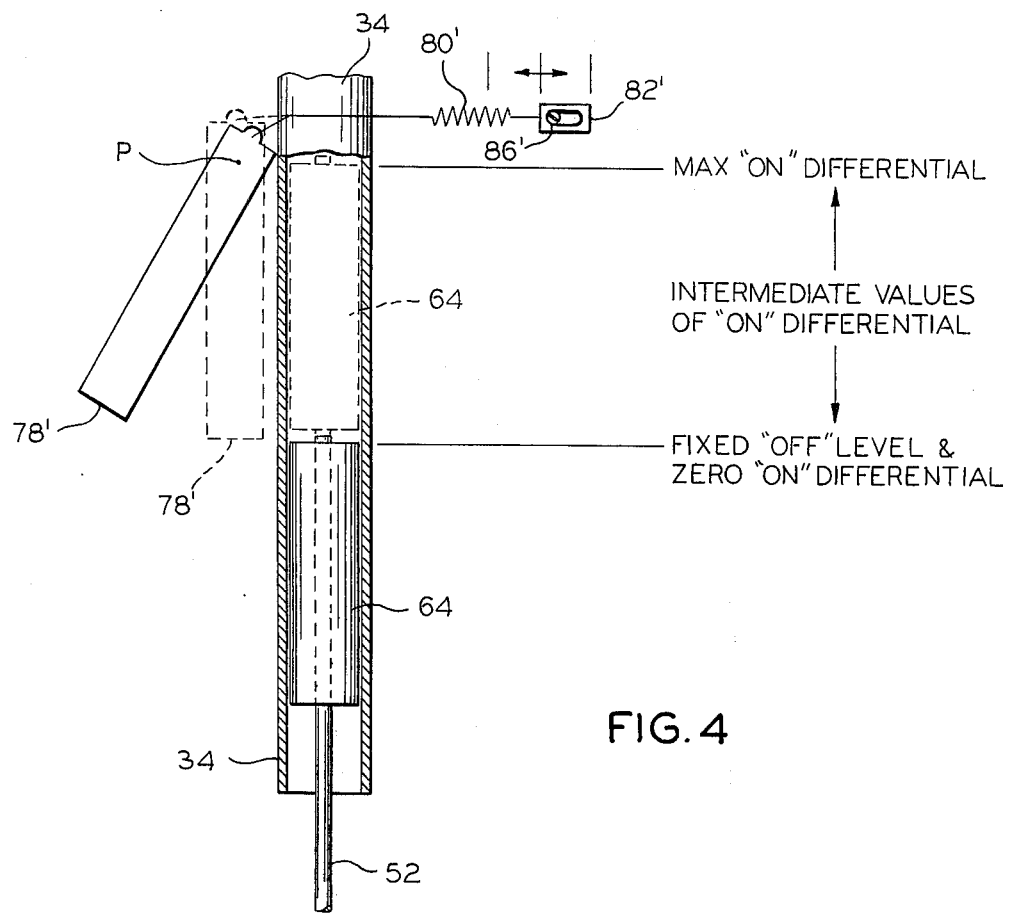

VERTICAL FLOAT SWITCH

BACKGROUND OF THE INVENTION

This invention relates to vertical float switches and, more particularly, to such switches which incorporate permanent magnets and a moving armature to actuate the switch functions.

Float switches are well known in the art and have been used in such applications as low water fuel cut-off controls which are connected to hot water boilers by way of upper and lower equalizing lines or pipes. The lower equalizing line is coupled to the boiler at a point below the minimum safe water level such that the float within the housing is approximately positioned at the safe water level. The upper equalizing line is connected to the boiler at a point above the minimum safe water level. If during operation of the boiler the water drops below a predetermined critical level, the float in the float chamber drops accordingly and actuates a switch device to activate an external circuit. This control function is then used to turn off a fuel supply such as a burner, to activate an external alarm, to replenish the water deficiency, etc. Float switches of this general type are exemplified in U.S. Pat. No. 3,831,429, which is assigned to the same assignee as the present invention.

Another type of float switch which is known and has been used in the art is the vertical float switch. These float switches utilize the cooperation between a moving armature, which is connected to the float support rod, and a pivotally mounted permanent magnet to actuate a mercury bulb switch. This type of float switch has the advantage that additional switched functions can be added to the switch by vertically cascading a plurality of switch assemblies, each having a separate permanent magnet and associated apparatus. For example, these switches may include the conventional low-water and burner on-off functions, a fuel water pump control, and a third function such as a high-water alarm. Theoretically, any number of desired switches can be added in accordance with the vertical span of the water and the significance of various vertical water levels.

In both of these types of float switches, it has been found that a differential adjustment of the various switch functions is highly desirable. Switch differential is the difference in (water) level between the point where the switch switches on versus the point at which it switches off. For example, once the water level causes the switch to actuate a burner circuit, it is highly desirable that the off function not be attained unless the water drops significantly below the turn on point. Otherwise, the burner can erratically turn on and off in response to a threshold water level situation or turbulence within the hot water boiler. This erractic on-off operation is detrimental of external apparatus such as burners and may pose a nuisance to alarm circuits and the like.

While the vertical float switch does permit a degree of switch differential adjustment, such adjustment is particularly difficult to attain. That is, the adjustment is accomplished by providing a lost-motion in the moving armature of the magnetic assembly. Thus, the vertical motion of the float rod advances the armature toward the permanent magnetic field until the armature captures the magnet and holds same until adjustable stops are reached. Thereafter, the water level must drop a predetermined distance to recover the lost motion whereupon the continued downward movement of the rod moves the armature away from proximity to the permanent magnet. Accordingly, to accomplish adjustment of the switch differential necessitates adjustment of the lost-motion in the armature which, in turn, requires total disassembly of the float switch in order to remove the float rod assembly. This problem is further aggravated by the fact that if a workman must re-adjust his initial adjustment, the float switch must be assembled for a test and then again disassembled to accomplish the final adjustment. In so doing, the hot water boiler may have to be cooled down or at least depressurized in order to accomplish the disassembly as the float chamber of the float switch is essentially an integral communicating part of the hot water boiler. This is a nuisance. Further, any adjustment to the differential effects all switches equally and independent adjustment of the different switches is therefore precluded.

A further disadvantage of these prior art vertical float switches is that inserts are utilized within the float chamber which function as a guide to restrain the vertical translation of the float rod solely along the longitudinal axis of the rod. Since these inserts are therefore in contact with the water, they are subject to contamination and fouling and may result in a jammed or immoveable float rod assembly. This is a problem.

These and other disadvantages are overcome by the present invention wherein there is provided a float switch having means for adjusting the switch differential essentially externally of the float switch housing and without necessitating disassembly of the float switch. The float switch differential may be adjusted with the float switch completely assembled and in communication with a live or operative hot water boiler. That is, the float switch may be externally adjusted while the hot water boiler is in operation and therefore fine adjustments or re-adjustments may be readily accomplished. Further, the adjustment may be performed on each switch independently of the other switches in the cascaded assembly. Still further, the invention also provides means for guiding the float rod assembly within the float switch at a point therein which is substantially removed from the normal water level. Thus, the problems of contamination and the following due to precipitation of the various minerals which are typically found in these hot water boilers are avoided.

SUMMARY OF THE INVENTION

Briefly, a float switch suitable for use with steam or hot water boilers is provided. The switch includes a housing having a first chamber therein and having first and second vertically spaced-apart wall openings for communication with the first chamber and the boiler. The housing includes a secondary chamber projecting away from the first chamber and in communication therewith. A float rod having a float fixedly mounted at its lower end and an armature of magnetic material fixedly mounted at its upper end is provided. Means are also provided for slidably mounting the rod within the housing wherein the armature is translated within the secondary chamber in response to translation of the float within the first chamber between the first and second openings. A switch frame is adjustably mounted to an external surface of the housing adjacent the secondary chamber and a permanent magnet is mounted, such as by a pivotal mounting, to the switch frame for translation toward and away from the secondary chamber. The switch includes first means for spring-biasing the magnet to urge the magnet away from the secondary chamber until the armature is translated to a given point in proximity to the magnet, whereupon the spring force of the first means is overcome by the magnetic force between the magnet and the armature and, therefore, the magnet is translated toward the secondary chamber. Means are also provided for adjusting the spring force of the first means over a range of values so that the given point can be varied over a corresponding range. At least one switch is operatively coupled to the magnet for controlling an external circuit in response to the translation of the magnet.

BRIEF DESCRIPTION OF THE DRAWING

The advantages of this invention will become more readily appreciated as the same becomes better understood by reference to the following detailed description when taken in conjunction with the accompanying drawing wherein.

DETAILED DESCRIPTION

Figure 1:
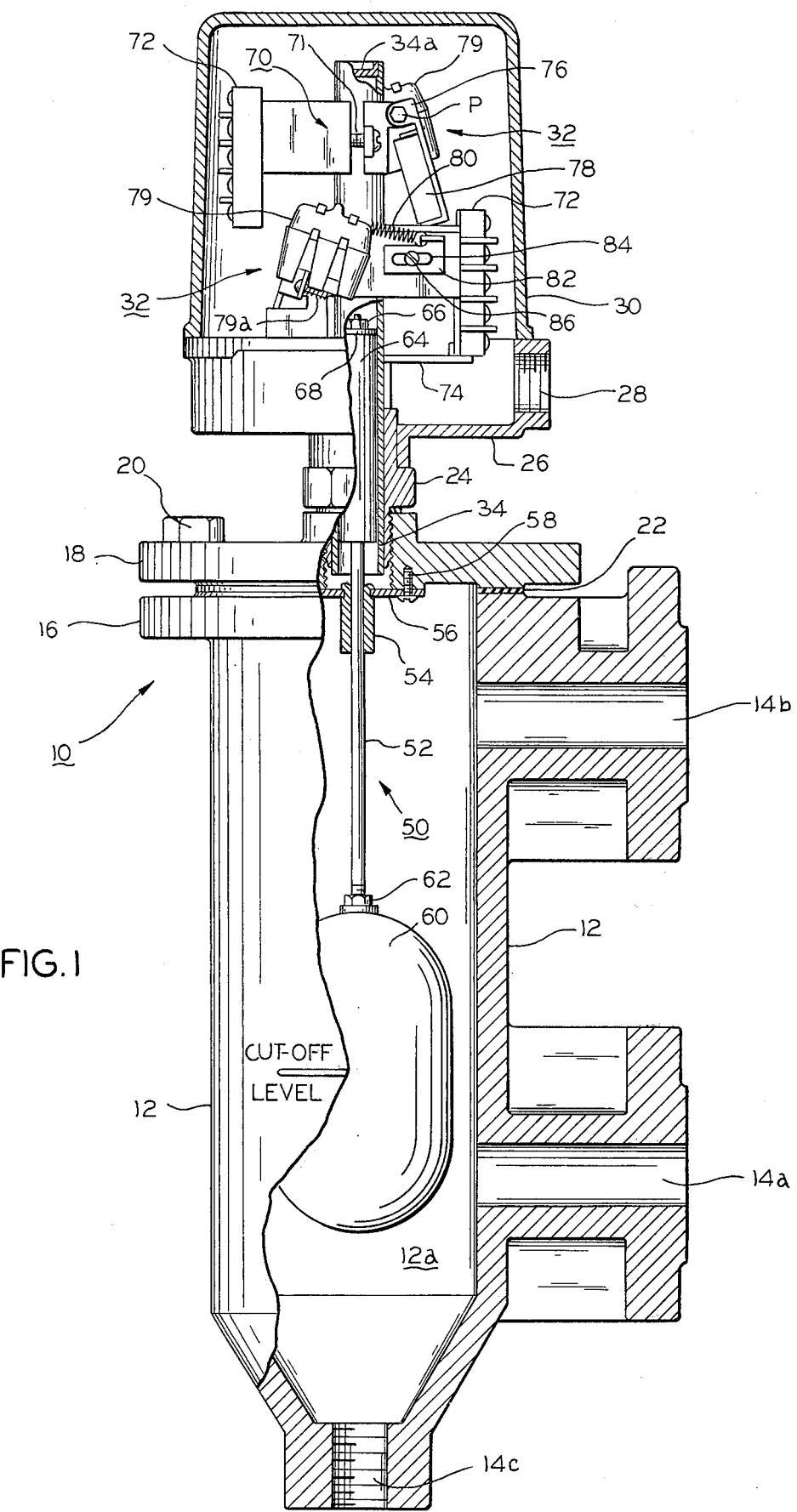
FIG. 1 is a plan view in partial section of a completely assembled vertical float switch in accordance with the present invention.

Referring now to FIG. 1, there is shown generally at 10 a vertical float switch including differential adjustment and guiding means in accordance with the principles of the present invention. Float switch 10 includes a float body housing 12 having a float chamber 12a therein. Housing 12 is preferably formed as a casting or fabricated weldment by conventional techniques. Housing 12 includes two spaced-apart openings 14a and 14b for connection to the lower and upper equalizing lines of an associated steam or hot water boiler (not shown), or the like. The structure of housing 12 which surrounds openings 14a and 14b facilitates connection to the equalizing lines as is well known in the art. Housing 12 further includes a lower opening 14c which may serve as an alternate connection point for the lower equalizing line or as a clean-out port to facilitate maintenance of the float switch. The upper end of housing 12 terminates in an annular flange 16 which is adapted for connection to a sealing flange 18 by conventional means such as fasteners 20 and a gasket 22. Sealing flange 18 is provided with a reduced, threaded central opening which receives the threaded end of a sealing tube assembly 24. Assembly 24 carries a switch base 26 having an electrical conduit opening 28 therein. A switch over 30 encloses the upper end of assembly 24 and provides a sealed cavity for one or more switch frame assemblies 32.

Sealing tube assembly 24 includes a sealing tube 34 of non-magnetic material such as 304 stainless steel which is fastened to the threaded fastener of assembly 24 at a lower portion thereof such as by welding. The upper end of sealing tube 34 is closed such as by welding a blind wall 34a to the end portion of tube 34. Thus, tube 34 forms a generally cylindrical secondary chamber which communicates with float chamber 12a of housing 12, which, in turn, communicates with the internal portion of an associated hot water boiler by way of openings 14a and 14b.

Slidably mounted within sealing tube 34 and float chamber 12a is a float rod assembly 50. Float rod assembly includes a rod 52 which is restrained to solely vertical translation by means of generally cylindrical guide collar 54 having an aperature along its longitudinal axis for receiving rod 52. Collar 54 is coaxially mounted relative to sealing tube 34 by way of mounting plate 56 which is fastened to housing 12 by way of suitable fasteners 58. Collar 54 is preferably swaged over mounting plate 56 to secure it thereon. The lower threaded end of rod 52 is connected to a hollow float 60 by way of fastener 62. The upper threaded end of rod 52 is secured to a magnetic, generally cylindrical armature 64 by way of fastening means 66. Armature 64 comprises a magnetic material such as 400 series stainless steel — i.e., with a high iron content. Sandwiched between fastener 66 and armature 64 is a slip washer 68 which preferably comprises a non-stick material such as, for example, the material known as Teflon.

Thus, armature 64 is translated in the direction of the longitudinal axis of sealing tube 34 and rod 52 in response to varying water levels about the cut-off level point in housing 12. The cut-off lettering and mark illustrated on housing 12 in FIG. 1 are preferably integrally cast with housing 12 during its manufacturing process.

Referring now more particularly to the switch frame assemblies 32 within switch cover 30, it can be seen that the switch frames are removably fastened to predetermined vertical levels about sealing tube 34 as by an integral clamp means shown generally at 70 which is fastened to tube 34 by way of screw 71. Mounted at one end of assembly 32 are terminal blocks 72 which facilitate electrical connections of the switch contacts, as described hereinafter, to external circuitry (not shown). In this regard, a wire barrier 74 is coaxially disposed about sealing tube 34 to accommodate routing of the electrical leads within switch base 26 and switch cover 30.

The other ends of switch frame assemblies 32 are provided with magnet brackets 76 which are pivotally mounted to switch frame assemblies 32 for translation toward and away from sealing tube 34. Each bracket 76 carries a permanent magnet 78 which, therefore, also translates toward and away from sealing tube 34. Each switch frame assembly 32 further carries a mercury switch 79 adjustably mounted thereon as by way of bracket 76. Mercury switches 79 are of conventional construction and accordingly need not be described in detail herein. However, each mercury switch 79 includes an adjustment screw 79a which facilitates the initial setup adjustment of the operating position of the mercury switches, which adjustment is normally done at the factory. It should be noted that switch 79 may also comprise a microswitch, or any other suitable switching device, which is either mounted to bracket 76 or to the switch frame itself so that switch 79 is operatively coupled to magnet 78 for controlling an external circuit in response to translation of magnet 78.

Each switch frame assembly 32 includes a spring which is mounted at one end thereof to a point on bracket 76 which is above the pivotal axis P thereof and at its other end to an adjustable fastener 82. Accordingly, spring 80 acts to urge bracket 76 and, therefore, magnet 78 and mercury switch 76 away from sealing tube 34. Adjustable fastener 82 includes a slotted portion 84 and is fastened to switch frame assembly 32 by way of a fixed fastener such as screw 86. As will be described more fully hereinafter, adjustable fastener 84 functions to adjust the effective length of spring 80 and therefore the spring force provided thereby. This has the effect of varying the on-off differential in the operation of mercury switch 79.

The operation of vertical float switch 10 of FIG. 1 is described as follows. Initially, however, it will be assumed that the lower switch frame assembly 32 in FIG. 1 is used to control a burner circuit whereas the upper switch assembly 32 is utilized to control a water pump circuit. That is, the burner switch is normally open but closes when the water level rises sufficiently to actuate the lower mercury switch. The pump switch is normally closed so that water is continuously fed into the hot water boiler until such time that the water level is sufficiently high to activate mercury switch 79 so as to shut off the water supply —i.e., there being sufficient water in the boiler to maintain satisfactory operation. Conversely, if the water level starts to fall so that the upper switch assembly is deactivated so as to again close the normally closed contacts of mercury switch 79 the pump will again turn on until the desired water level is attained. If however, a pump malfunction or water leak exists, the water level will continue to drop until the lower switch assembly deactivates mercury switch 79 so as to assume its normally open condition whereupon the burner shuts off.

Thus, once vertical float switch 10 is connected via the equalizing lines to an associated hot water boiler, and the system is charged with water, the water level rises causing a corresponding vertical translation of float 60 and therefore rod 52. Accordingly, armature 64 is translated vertically until it is in close proximity to magnet 78 of the lower switch frame assembly 32. At that time, the magnetic attraction between magnet 78 and armature 64 causes bracket 76 to be translated toward tube 34 against the force provided by spring 80. Thus, at this point the burner circuit is activated. As the water continues to rise — due to the normally closed condition switch 79 of the upper switch assembly 32 — armature 64 advances further vertically until it is also in close proximity to magnet 78 of upper switch assembly 32. At this time, bracket 76 is similarly translated, against the force of its spring 80, toward sealing tube 34, thereby opening the normally closed contacts of the pump switch. Thereafter, the hot water boiler system assumes its normal or steady-state operation.

If, however, the water level should drop slightly, or insignificantly, due to turbulence for example, and armature 64 is accordingly translated downwardly a corresponding amount, the upper switch contacts nevertheless remain open and the pump does not cycle erratically. This desired operation follows from the differential between the on and off operations of the switch assembly, as will be discussed more fully hereinafter.

Figure 2:
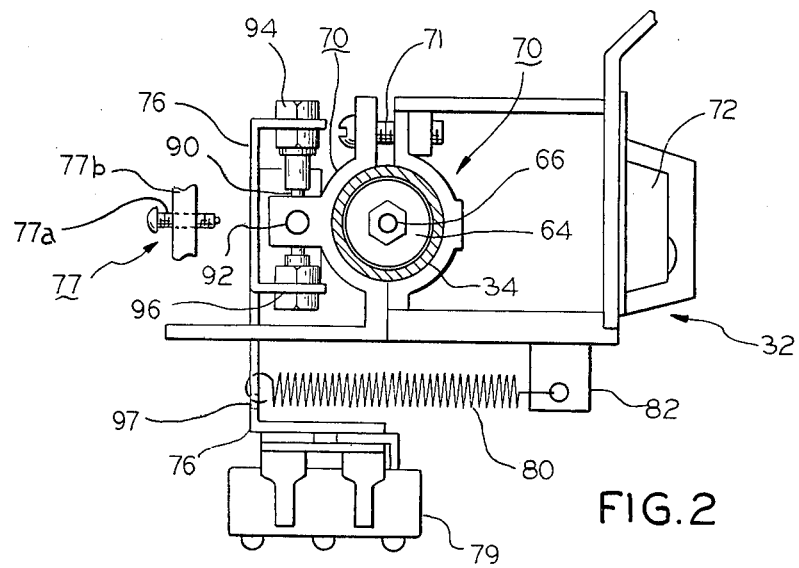
FIG. 2 and 3 are top and side views, respectively, of one of the switch frame assemblies illustrated in FIG. 1; and, FIG. 4 is a combined schematic and pictorial diagram which is useful in describing the differential adjustment and operation of the armature and permanent magnet members, in accordance with the present invention.
Figure 3:
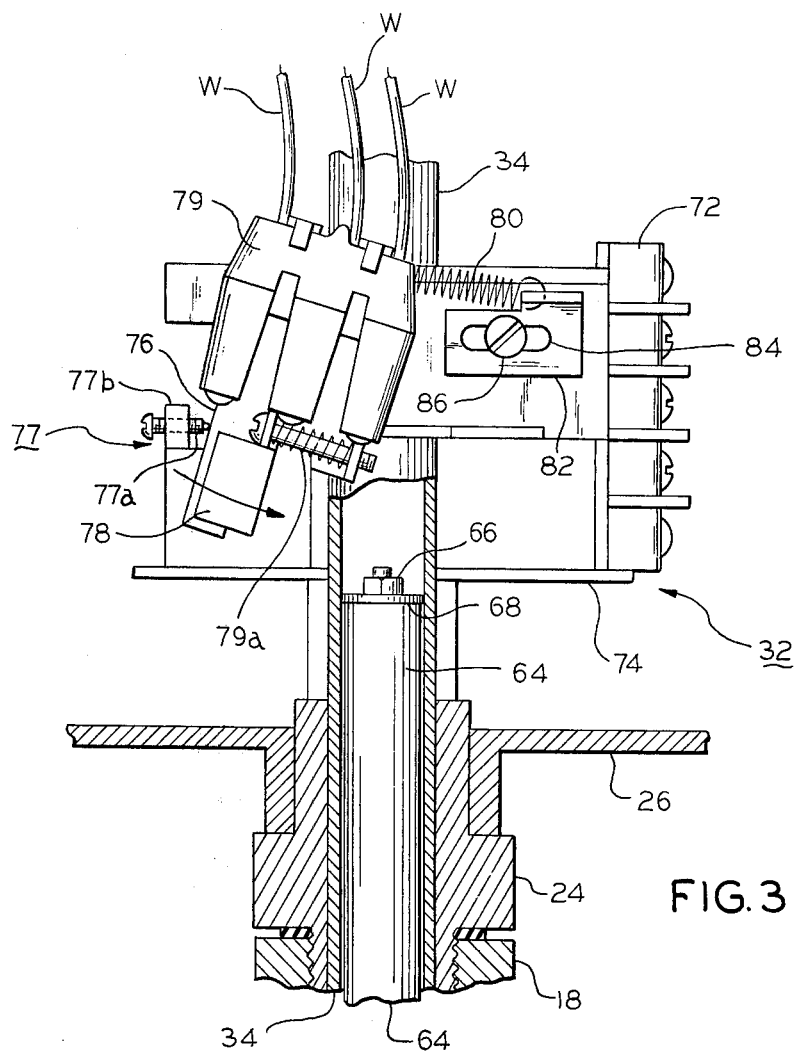

Referring now to FIGS. 2 and 3 there are shown, somewhat more clearly, top and side views of switch assembly 32 in accordance with the present invention. It can be seen by reference to FIG. 2 that bracket 76 is pivotally mounted to a projection of clamp 70 by way of a pivot pin 90 which is disposed in a transverse bore in the projection and held therein by a setscrew 92. Pivot nuts 94 and 96 each include a cylindrical recessed bore for accepting the end portions of pivot pin 90. In this regard, pivot pin 90 is somewhat undercut to minimize the friction between pin 90 and pivot nuts 94 and 96. It can also be seen that spring 80 is connected to bracket 76 at a suitable hole 97 which is provided slightly above the pivotal axis of pivot pin 90.

Referring now to FIG. 3, it can be seen that electrical leads or wires W extend from mercury switch 79 and terminate onto terminal block 72. In actual practice, these leads are covered with ceramic bead heat insulators due to the relatively high ambient temperatures encountered in hot water boiler applications. FIG. 3 also illustrates somewhat more clearly the cooperating guide function provided by washer 68 on armature 64. It can be seen that washer 68 extends somewhat radially outwardly from armature 64 for contact with the inner walls of sealing tube 34. As previously discussed, the material of washer 68 is preferably of the type which minimizes friction and which repels precipitation of contaminants thereon.

It can be seen by reference to FIG. 3 that adjustable fastener 82 provides means for adjusting the spring force of spring 80. That is, by loosening screw 86 and moving member 82 within the range provided by slot 84, the effective length of, and therefore the spring force of, spring 80 can be varied. This force acts oppositely relative to the magnetic attraction force between permanent magnet 78 and armature 64. Therefore, by increasing the spring force provided by spring 80, a greater magnetic force between permanent magnet 78 and armature 64 is required to translate bracket 76 toward sealing tube 34. Since the magnetic force is increased by advancing armature 64 upwardly into closer proximity to permanent magnet 78, the increased spring force necessitates a greater penetration of armature 64 to activate mercury switch 79. Conversely, by reducing the spring force of spring 80, the magnetic force required to translate bracket 6 — and therefore activate mercury switch 79 — is accordingly reduced. Thus, switch 79 is activated at progressively lower levels, with respect to the penetration of armature 64, as the spring force of spring 80 is reduced.

The spring constant and, therefore, spring force of spring 80 and the length of slot 84 are preferably selected so that when adjustable fastener 82 is adjusted to provide minimum spring force, bracket 76 is translated about its pivotal axis when the upper portion of armature 64 is just at the level corresponding to the lowest point or permanent magnet 78. Then as adjustable fastener 82 is adjusted to provide greater levels of spring force, armature 64 must advance a greater distance before bracket 76 is translated, in response to the increasing magnetic force, toward tube 34. Further, the two primary variables —i.e., the spring constant of spring 80 and the adjustment range of adjustable member 82— are preferably selected such that the maximum spring force just equals the maximum magnetic force when armature 64 is essentially fully advanced into maximum proximity with permanent magnet 78.

Moreover, when bracket 76, and therefore permanent magnet 78 and switch 79, are translated about their pivotal axis toward sealing tube 34, the air gap between permanent magnet 78 and armature 64 is reduced to its minimum value. Accordingly, the magnetic force between magnet 78 and armature 64 increases to its maximum value. Thus, even if armature 64 is thereafter translated downwardly, the spring force provided by spring 80 is insufficient to translate bracket 76 back to its normal position until the uppermost portion of armature 64 is at the lowermost portion of magnet 78. Hence, a differential exists between the turn-on and turn-off functions of switch assembly 32. The off position is substantially fixed to the point where the uppermost portion of armature 64 just reaches the lowermost portion of permanent magnet 78. However, as previously described, the on function of switch assembly 32 can be varied by adjusting the spring force of spring 80 by way of adjustable fastener 82.

Referring again to FIG. 3, it can be seen that an adjustable stop 77 is provided on a projection of switch frame assembly 32. Stop 77 functions as a back stop to limit the maximum translation of bracket 76 away from sealing tube 34. Thus, stop 77 provides an air-gap adjustment to control the maximum air gap between permanent magnet 78 and armature 64. Stop 77 preferably includes an adjustable screw 77a which can be advanced through a threaded bore in a stationary projection 77b of stop 77. In actual practice, stop 77 is adjusted, after the spring force of spring 80 has been adjusted to its maximum value, so that bracket 76 translates toward sealing tube 34 when armature 64 is fully advanced into proximity with permanent magnet 78. Hence, this adjustment ensures that the switch will, in any event, operate when armature 64 is in maximum proximity with permanent magnet 78. This safety feature avoids having excessive spring force which could otherwise preclude operation of the switch.

Referring now to FIG. 4, there is shown a simplified diagram illustrating the differential operation of switch frame assembly 32 in accordance with the present invention. Adjustable fastener element 82' is depicted as being in the maximum force position. Accordingly, permanent magnet 78', which is pivotally translatable about pivotal axis P, is urged outwardly as represented by the solid lines in FIG. 4 until armature 64 is advanced to the position shown in broken lines in FIG. 4. At that time, magnet 78' translates toward tube 34 as the magnetic force between permanent magnet 78' and armature 64 exceeds the restraining force provided by spring 80'. However, as previously discussed, the air gap between 78' and armature 64 is now at its minimum value and, therefore, the increased magnetic force is sufficient to overcome the maximum force of spring 80' until armature 64 is translated back to the position depicted in solid lines in FIG. 4. As adjustable fastener 82' is adjusted to provide less spring force, the magnetic force required to translate magnet 78' toward tube 34 becomes correspondingly less. Thus, there is provided a variable differential between the fixed off-level and the associated on-level which accomodates the differential switching function in accordance with the present invention.

It will now be appreciated by those skilled in the art that the differential switching adjustment function in accordance with the present invention, is not only accomplished externally of the float chamber and sealing tube chamber, so as to permit such adjustments without disassembling the overall vertical float switch, but that such adjustment can be independently provided on each switch assembly in the cascaded vertical array. Further, it should also be appreciated that the float rod guide function provided by the generally cylindrically coaxial collar and to a lesser degree the washer member at the top of armature 64 avoids the need for guiding means sleeves and the like in the hostile environment of the float chamber itself.

What has been taught, then, is a float switch assembly suitable for use with various boilers and facilitating, notably, individual switch differential adjustment, and a unique guiding means for the float rod assembly. The form of the invention illustrated and described herein is but a a preferred embodiment of these teachings. It is shown as an illustration of the inventive concepts, however, rather than by way of limitation and it is pointed out that various modifications and alterations may be indulged in within the scope of the appended claims.

We claim:

1. A float switch suitable for use with a boiler, said switch comprising, in combination:

A housing having a first chamber therein, said housing having first and second vertically spaced-apart wall openings for communicating said first chamber with said boiler, and said housing having a secondary chamber projecting away from said first chamber and in communication therewith;

a float rod having a float fixedly mounted at its lower end thereof and having an armature of magnetic material fixedly mounted at its upper end thereof;

means for slidably mounting said rod within said housing wherein said armature is translated within said secondary chamber in response to translation of said float within said first chamber between said first and second openings;

a switch frame mounted to an external surface of said housing adjacent said secondary chamber;

a magnet assembly including a permanent magnet mounted to said switch frame for translation toward and away from said secondary chamber;

first means for spring biasing said magnet to urge said magnet away from said secondary chamber until said armature is translated to a given point in proximity to said magnet whereupon the spring force of said first means is overcome by the magnetic force between said magnet and said armature and said magnet is translated toward said secondary chamber;

means for adjusting said spring force of said first means over a range of values so that said given point can be varied over a corresponding range;

an adjustable stop mounted to said frame and engaging a portion of said magnet assembly when said magnet is translated a given distance away from said secondary chamber to selectively limit the maximum translation of said magnet to control the maximum air gap between said magnet and said armature thereby cooperating with said first means and said means for adjusting said spring force for limiting the relative values of said spring force and said magnetic force wherein the maximum value of said spring force is less than the maximum value of said magnetic force; and, at least one switch operatively coupled to said magnet for controlling an external circuit in response to said translation of said magnet.

2. The float switch according to claim 1, wherein said means for slidably mounting said rod within said housing includes a generally cylindrical collar fixedly mounted to said housing and receiving said rod therein for restraining the motion of said rod to translation along its longitudinal axis.

3. The float switch according to claim 2, wherein said secondary chamber comprises a non-magnetic tube fixedly mounted to said housing about third opening therein and projecting vertically therefrom, sid tube being sealed at its upper end; wherein said armature comprises a generally cylindrical member slidably disposed within said tube; and wherein said member includes guide means extending radially from said member and cooperating with said collar for further restraining the motion of said rod to said translation along its longitudinal axis.

4. The float switch according to claim 1, wherein said first means comprises a spring connected between said switch frame and said permanent magnet and wherein said means for adjusting said spring force includes an adjustable fastener for varying the effective length of said spring.

5. The float switch according to claim 4, wherein said adjustable fastener includes a slotted member moveably secured to said frame over a range of positions determined by the length of a slot provided therein.

6. The float switch according to claim 1, wherein there are provided a plurality of separate ones of said permanent magnet and wherein each magnet is provided with respective ones of a plurality of said first means, said means for adjusting said spring force and said at least one switch, whereby the spring force of each respective first means can be adjusted independently of the other ones of said first means.

7. The float switch according to claim 1, wherein said permanent magnet is pivotally mounted to said switch frame.

* * * * *